2 Sheets--Sheet 1.

G. T. PALMER.

Improvement in Propeller-Carriages.

No. 126,900. Patented May 21, 1872.

Witnesses.
Jas Palmer,
Chas E. Frost.

Inventor:
George T. Palmer.

2 Sheets--Sheet 2.
G. T. PALMER.
Improvement in Propeller-Carriages.
No. 126,900. Patented May 21, 1872.
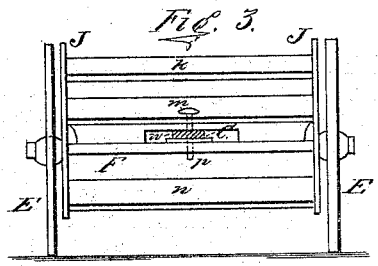
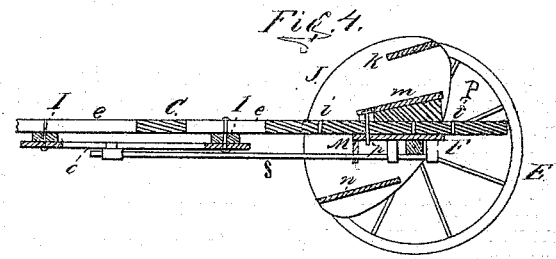
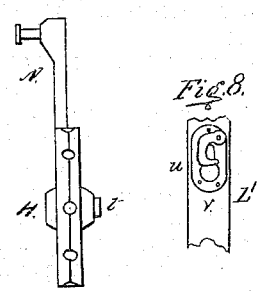
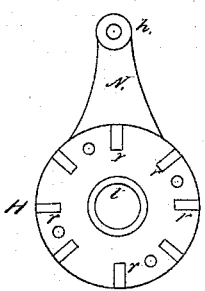
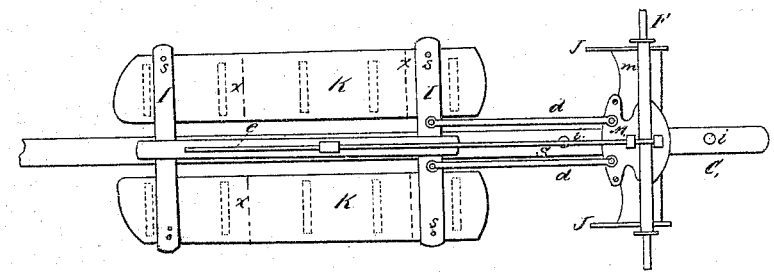
Witnesses.
Jas Palmer
Chas. E. Foust
Inventor,
George T. Palmer 126,900

UNITED STATES PATENT OFFICE.

GEORGE T. PALMER, OF BROOKLYN, NEW YORK.

IMPROVEMENT IN PROPELLER-CARRIAGES.

Specification forming part of Letters Patent No. 126,900, dated May 21, 1872.

I, GEORGE T. PALMER, of Brooklyn, in the county of Kings and State of New York, have invented certain Improvements in Propeller-Carriages, of which the following is a specification:

The first part of my improvements relate to providing a youth's propeller-carriage with an extra seat, drawn out from the permanent seat, so that the carriage may be readily converted from a single-seat to a double-seat one; second, providing a propeller-carriage, having two permanent or ordinary propelling-levers, with two additional removable propelling-levers, so that the carriage may be propelled by one youth; or that it may be readily converted into a double-seated propeller-carriage with two sets of propelling-levers, and be operated by two youths at the same time; third, attaching convenient steering-bars and foot-guards to the axle of the steering-wheels of a propeller-carriage, so that the steering may be effected by the feet of the rider directly over or under the axle, and within or near the limits of the rims of the steering-wheels; fourth, providing a propeller-carriage with steering-platforms or bars under the permanent seat, so that a youth occupying the out-drawn or rear seat may steer the carriage, if desired; fifth, providing means to shift the position of the axle of the steering-wheels either forward or back on the frame of a propeller-carriage by making extra sockets or holes for the pivot-pin or bolt on which the axle turns, so that the steering-wheels and steering-bars may be adjusted back or forward to accord with the size and convenience of the rider; sixth, pivoting the steering-wheels inside of the steering-axle or toward the driving-wheels' axle, so that the carriage may turn in a shorter space than if the axle was pivoted to the carriage-frame at its center; seventh, combining a spring with the axle of the steering-wheels and frame of a propeller-carriage, for the purpose of preventing the steering-wheels turning too easily; also, to retain the axle in a cross position to the length of the carriage until turned by pressure from the rider; eighth, making the hubs of the driving-wheels with a crank-pin arm extending from the outside part thereof.

Figure 1:
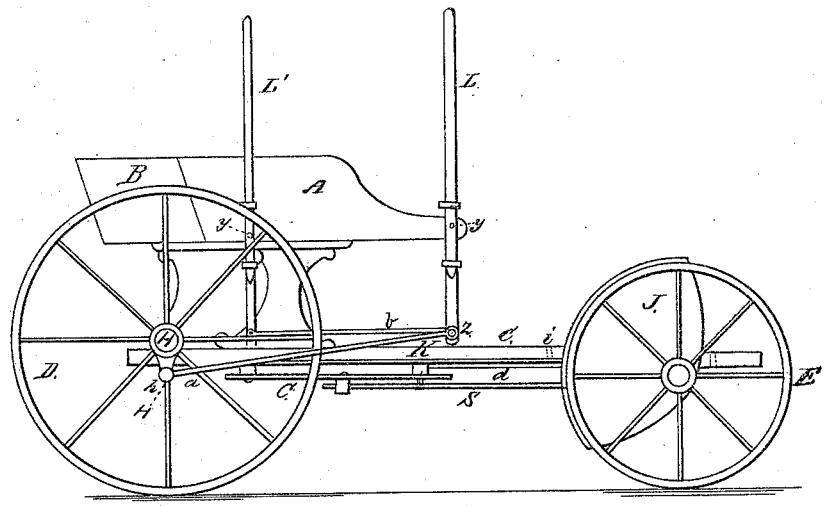
Figure 2:
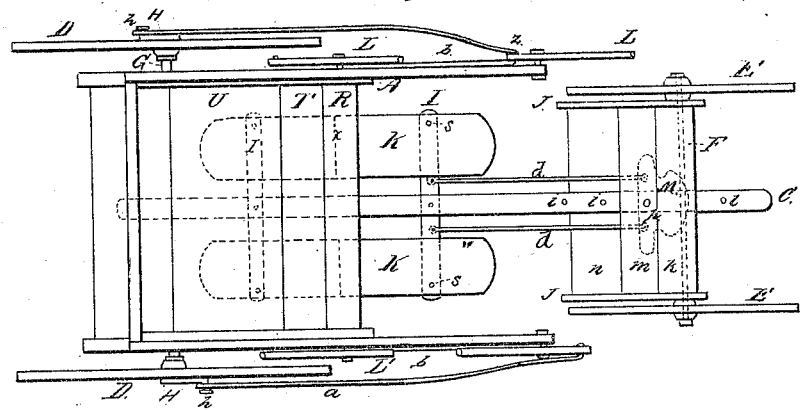

In the accompanying sheet of drawing, Figure 1 is a side view of my improved propeller-carriage. Fig. 2 is a top or plan view of Fig. 1. Fig. 3 is a rear view of the steering-wheels, with steering-bars and foot-guards attached to the axle thereof. Fig. 4 is a central section of the front part of the frame of the carriage and across the axle of the steering-wheels and steering-bars. Fig. 5 is a bottom view of a portion of the bottom of the carriage. Fig. 6 shows the inside of the outside part of the driving-wheels' hub. Fig. 7 is an edge view of the driving-wheels' hub. Fig. 8 is a portion of one of the removable propelling-levers, showing a plate with a slotted hole thereon, by which it may be attached to a pivot-pin on the side of the body of the carriage. Fig. 9 shows the end of rod $b$ connected to the forward lever L.

Like letters in the drawing indicate the same parts.

A is the body or permanent seat of the carriage. B is an extra seat, formed of a portion of the permanent seat, drawn out at the rear of body A. D D are driving-wheels. C is a rail, forming a part of the carriage-frame. E E are steering-wheels; F, the axle to the steering-wheels; M, a plate fixed to the axle F at its front part, and pivoted to the frame-rail C by a pivot-pin or bolt, $p$. P is a rail or bar fixed to the axle F. $w$ is an aperture in the bar P to allow the axle F to turn freely with the rail C. $m$ is a steering-bar fixed to the bar P. J J are side-guards to prevent the feet of the rider from coming in contact with the wheels E, and are firmly secured to bars $m$ and P and axle F. $k$ and $n$ are steering-bars attached to the foot-guards J. $i\,i$ are extra sockets or holes in the rail C for the pivot-pin $p$. $e\,e$ are slots in rail C. I I are cross-bars pivoted, by pins or bolts passing through slots $e\,e$, centrally to the rail C. K K are platforms, pivoted at their outward sides to the cross-bars I by pivot-pins $s\,s$. $x\,x$ are cross-bars on the upper side of platforms K K for the feet of a rider in the seat B to press against. $d\,d$ are rods, which are pivoted at one end to the forward cross-bar I, and at the other to the plate M in a cross-line with the pivot-pin $p$. $c$ is a rail secured on the pivots of bars I. S is a straight spring, one end of which is fixed to the axle F and plate M, and the other secured to the rail $c$. G is the axle-bar to wheels D. L L are hand-propelling levers, pivoted by pins $y$ to the forward part of body A. $a\,a$ are driving-rods, which are pivoted to the lower end of levers L and to crank-pins $h$ on the wheels D. L' L' are hand-propelling levers, pivoted to the body A by pins y in such manner that they may be readily removed or attached, as may be required. b b are driving-rods, which are connected by pivot-pins to the lower end of levers L', and also to the lower end of levers L, thereby making a connection with the driving-rods a and crank-pin h. H H are hubs to wheels D. The hubs H are made of cast metal, in two parts, and riveted firmly together. The outside plate is shown by Fig. 6 with a crank-arm, N, cast with it, so as to form one piece. t is a projection on the inside of the exterior hub-plate, which passes through an aperture in the inside plate and forms the axle-box or socket for the axle. r r are sockets to receive the wheel-spokes. h is the crank-pin.

In Figs. 8 and 9 are shown portions of levers L' and L. v is a plate on lever L', with a slotted aperture to receive the pivot-pins y. u is a pivoted lock-hook to catch under pins y and prevent the levers from being detached. b in Fig. 9 is the front end of rods b, Fig. 1, shown to be hooked over the pin z at the lower ends of levers L; and u a lock-hook, shown to be thrown back so that the rod b may be removed from the lever L. Thus one means of attaching the levers L' and rods b are shown; but any suitable means of making the levers detachable may be used.

When the part B is closed into the body A the carriage-seat is formed by a permanently-fixed part, R, a removable part, T, and a back-drawing part, U; but when the part U is drawn back to form a rear seat, as shown by B, Fig. 1, the part T may be moved forward of the part R to extend the front seat forward. There will then be a vacant space between the back edge of R and the front edge of U for the feet of the rider in the back seat to pass to the platforms K under the front seat. The platforms K K being pivoted to the ends of bars I, and the rods d much nearer to the pivots of bars I, will give the platforms a long and nearly straight movement when the axle F is turned to steer the carriage. The bars I may be fixed crosswise to the rail C with the pivots omitted, and the platforms K made to slide on the bars by attaching the rods d to the platforms and bending their forward ends, so as to pivot them to the plate M or axle F near to the wheels E, which will give a long movement to the platforms in steering, as produced by the arrangement shown in the drawing. By the combination of the plate M with the axle F the axle is pivoted by the pin p nearer to the driving-wheels' axle than it would be were the axle F pivoted at its center; and when the axle is turned the steering-wheels will be thrown off to one side of a central position with the rail C and brought nearer to the wheels D, and cause the carriage to turn in a much shorter space than if the axle was pivoted at its center in the manner now practiced. Youths' propeller-carriages are used mostly on walks, and require to turn in a short space. The pivot-pin p on plate M may be placed at any distance from axle F that will allow of a proper control of the steering-wheels by the rider of the carriage. The different heights of the steering-bars k m n will give a choice of use, to suit the convenience of the rider; and by moving the axle F forward or back and pivoting the plate M to another of the holes i, the bars k m n may be placed to suit the length of reach of youths of different ages and sizes.

When the pin p is withdrawn and the axle F moved forward or back, the platforms K will move with it by the pivots of the bars I moving in the slots e; therefore the platforms K should be made long enough to be within convenient reach of a rider in the back seat at all positions of the steering-wheels' axle when pivoted to the rail C. The foot-guards J J will protect the feet of a rider from getting in contact with the steering-wheels, and his clothes from being soiled or injured by their rims. The spring S is attached to the axle F, plate M, and rail c, so that when the axle F is turned by pressure from the steering-bars the spring will be bent; but when the pressure is removed the spring will bring the axle to a cross position with rail C and retain the steering-wheels for a straight movement. The spring S should be stiff enough to bring the axle F to a cross-position with rail C, and prevent a sudden or too easy movement of the steering-wheels when but a slight pressure is made upon the steering-bars. By the use of the spring S a little more pressure on the steering-bars will be required to operate the steering-wheels; but the rider will have a much easier control over the steering of the carriage. An easy movement of the steering-wheels makes the steering of the carriage unsteady, and to some persons quite difficult. Other kinds of springs may be substituted for the straight spring when properly combined with the carriage.

When the carriage is used as a single-seat propeller the seat B is closed into the body A and the levers L removed, and, if required, the steering-bars properly adjusted to the reach of the rider. The rider may then oscillate the levers L, which, by means of rods a and crank-pins h, will turn the wheels D and set the carriage in motion, and steer by the feet on either of the steering-bars k, m, or n.

When the carriage is to be used as a double-seat propeller the back of the seat is drawn out and the levers L' placed in connection with the pivots y, rods b, lower ends of levers L, rods a, and crank-pin h on wheels D, as shown in Fig. 1. A rider may then occupy the seat B, and, by oscillating the levers L', set the carriage in motion by means of the rods b and a and crank-pin h, turning the wheels D; and, by the feet on the platforms K, operate the steering-wheels by means of rods d, plate M, and axle F.

The carriage being provided with two sets of propelling-levers and a double means of steering, and convertible into a two-seat propeller, two youths may propel and steer at the same time; or two may propel and one steer;

or one may propel and the other steer; or one may propel and steer, and the other take no part therein.

The combination and arrangement of the levers L' and rods b and a with the crank-pin h enables the placing of the levers L' on the carriage-body so as to work entirely inside the rims of the wheels D, which adapt the combination for use on a propeller having the driving-wheels forward of the steering-wheels, as the levers may be pivoted near to a vertical line with the axle of the driving-wheels, or directly over the axle, if desired, with the rods b and a passing to the rear of the wheels, where they may be supported by a strap pivoted on the body at the rear of the driving-wheels. Both sets of levers may be made removable and connected to the carriage by any means deemed suitable.

It is not necessary to prescribe any number of steering-bars to be made in combination with the axle F and guards J, as the bar m may be used alone; or the bars m and n, or the bars k, m, and n, as may be desired.

The back of the body A or permanent seat may be hinged so as to fold down on suitable supports, and a portion of the permanent seat made removable to form a substitute for the outdrawing seat B; but I prefer the outdrawing seat, as it is readily brought to its position, and retains a more compact and uniform appearance with the body A than could be readily made with a folding back.

Having thus described my improvements in youths' propeller-carriages, I claim—

1. The combination of the extension B with the body A or permanent seat of a propeller-carriage, substantially as herein shown and set forth.

2. The combination of levers L', driving-rods b and a, the riveted lower parts of levers L, or an equivalent means of suspending the joining ends of rods b and a, and driving-wheels D of a youth's propeller-carriage, whereby the carriage may be propelled by the application of power to the levers L' only, substantially as herein shown and specified.

3. The combination of the propelling-levers L' L' and L L with the driving-rods and driving-wheels of a youth's propeller-carriage, substantially as and for the purpose herein shown and specified.

4. The combination of a steering-bar m with the axle F and steering-wheels of a propeller-carriage, substantially as herein shown and set forth.

5. The foot-guards J J, combined and arranged with relation to the axle F and steering-wheels of a propeller-carriage, substantially as and for the purpose herein shown and specified.

6. In combination with the axle F and steering-wheels of a propeller-carriage, the platforms K K, arranged with relation to the reach or frame of the carriage, substantially as and for the purpose herein shown and set forth.

7. Providing the reach C of a youth's propeller-carriage with holes i i or means equivalent thereto, whereby the device for steering the carriage may be adjusted at different distances from the carriage-seat, substantially as and for the purpose herein shown and specified.

8. The combination of steering-wheels, axle F, plate M, rods d d, pivoted bar I, or steering-platforms K K, and the frame of a propeller-carriage, substantially as and for the purpose herein shown and set forth.

9. The combination of the steering-bar m, axle F, and plate M with the reach or frame of a propeller-carriage, substantially as herein shown and set forth.

10. The combination of a spring S with the steering-wheels' axle F and frame of a propeller-carriage, substantially as and for the purpose herein shown and specified.

GEORGE T. PALMER.

Witnesses:
JAS. PALMER,
CHAS. E. FROST.